United States Patent
Abbe

[15] 3,694,741
[45] Sept. 26, 1972

[54] COUPLED INDUCTANCE IMPEDANCE MEASURING CIRCUIT WITH INCREASED SENSITIVITY AND FREQUENCY INDEPENDENCE

[72] Inventor: Robert C. Abbe, Newton, Mass.
[73] Assignee: ADE Corporation, Newton, Mass.
[22] Filed: Oct. 28, 1970
[21] Appl. No.: 84,554

[52] U.S. Cl..................324/60 C, 324/119, 324/123, 324/DIG. 1
[51] Int. Cl..........................G01r 11/52, G01r 27/26
[58] Field of Search........................... 324/57, 60, 61, 119, 123 DIG 1

[56] References Cited

UNITED STATES PATENTS 2,993,170  7/1961  Smith ..........................324/81
3,320,527  5/1967  Marlow ........................324/60

FOREIGN PATENTS OR APPLICATIONS 1,233,130  10/1960  France.........................324/57

Primary Examiner—Stanley T. Krawczewicz
Attorney—Chittick, Pfund, Birch, Samuels & Gauthier

[57] ABSTRACT

An impedance measuring circuit having two closely coupled inductances conducting alternating electric excitation from a grounded source through measuring and balancing impedance branches respectively to ground. Peak detection circuitry referenced to ground in the impedance measuring circuit gives an indication of the difference in the voltage across the measuring and balancing impedances. Where measuring and balancing impedances are capacitive reactances and at source frequencies above resonance of the inductance-capacitance circuit, substantial frequency independence is achieved.

5 Claims, 2 Drawing Figures

INVENTOR
ROBERT C. ABBE

BY Chittick, Pfund,
Birch, Samuels & Gauthier
ATTORNEYS

COUPLED INDUCTANCE IMPEDANCE MEASURING CIRCUIT WITH INCREASED SENSITIVITY AND FREQUENCY INDEPENDENCE

BACKGROUND OF THE INVENTION

This invention concerns instrumentation for capacitive sensors of the type shown in my copending application Ser. No. 64,240, wherein a measured capacitance is compared with a balancing or reference capacitance, or the relative value of two capacitive quantities related to the measure of the parameters such as distances, dimensions, etc., in a particular environment are required. There is a need for accurate instrumentation simply and inexpensively constructed.

One difficult to achieve but highly desirable property of accurate capacitive sensors is sensitivity, the amount of variation in the output of the instrumentation for a given variation in the capacitance measured. An increase in sensitivity will increase accuracy by reducing the amount of capacitive variation masked by the instrumentation's uncertainty.

Where reactive impedances such as capacitance are measured, the instrumentation for the sensor commonly uses an alternating electric excitation source. Both the frequency and output magnitude of this source normally affect the output and sensitivity of the system. Both are expensive to regulate. By making the output of the instrumentation independent of one of these parameters specifically frequency the source can be made more simply and inexpensively as well as of more suitable size and configuration for equivalent accuracy. In addition where the physical quantities measured produce the capacitance variation measured in a background which is large relative to the variation (which is generally the case in cases where only physically small probes can be introduced for measurement purposes) any magnification of the useful signal that can be achieved at the source of the variation greatly simplifies the problem and improves the signal to noise or background ratio.

There have been past difficulties in the practical application to physical metrology of capacitance change as a part of a transducer system. These past difficulties devolve principally from the geometrical and configurational constraints placed on the capacitive transducer and by the requirements of typical measurement applications, and the consequent unsuitability of standard laboratory bridge measuring techniques for application to these measurement problems.

The constraints placed on the capacitive transducer are electrical, geometric and configurational, as the transducer shell, ordinarily of metal, will be arbitrarily attached electrically as well as mechanically to some structure contiguous to the point of measurement, and the transducer must be of reasonable size and of the proper shape for the required measurement application as well as of a configuration such that the appropriate measurement is properly transduced into a suitably related capacitance change. Typically, these constraints make utilization of transducers with full scale capacitance change in the range of a few tenths to a few tens of pf the largest practical full scale capacitance change achievable.

In addition, it is frequently required that the capacitive transducer operate at a distance considerably removed (say 100 feet) from the bulk of the signal conditioning electronics and in an environment which is electrically different from that of the signal conditioning electronics so that noise and error are likely to arise from this source. Despite this, it is frequently required in order that the equipment be a useful advance in the state of the art that accuracies on the order of $1:10^5$ be achieved in the electrical output from the system.

It is also a general requirement that the demodulator provide a bipolar signal output passing through zero so that information as to the sense of the capacitance difference between two capacitors is preserved. Past demodulation schemes such as bridge rectifiers which are directly coupled to the bridge areas do not give a bipolar output.

Simple bridge instrumentation that operates around a null or zero output is known. This instrumentation, however, does not normally have the advantage of measuring the output from a potential which is simultaneously a ground or point common to one side of the source, measuring capacitance and balancing capacitance.

A further problem of sensor instrumentation is error induced from having a low lever A.C. signal pass from the sensor which may be in an electrically noisy environment, and considerably removed physically from the processing electronics, to the processing electronics, by which point there may appear together with the signal significant error signals.

A further problem of capacitor sensor instrumentation has been that simple high level demodulation schemes such as applied to ordinary bridges reduce the sensitivity of the sensor output significantly, introduce further nonlinearity and render the output sensitive to changes in the value of filter capacitors and to the magnitude of the signal current drawn from the demodulator.

In addition, demodulation schemes involving diodes, the most usual means of rectification of A.C. signals, ordinarily have significant errors introduced either due to diode forward voltage drop, or matching error.

A further problem of sensor instrumentation is error induced from having the total sensor excitation pass through the metering or indicating device.

It is thus a general object of this invention to provide simple, sensitive, inexpensive and accurate instrumentation for a capacitive sensor.

It is a specific object of this invention to provide increased sensitivity in instrumentation for a capacitive sensor.

It is a further specific object of this invention to provide frequency independent instrumentation for a capacitive sensor.

It is a still further specific object of this invention to provide null output ground referenced instrumentation for a capacitive sensor with the source and measuring impedance also ground referenced.

It is a yet further object of this invention to provide instrumentation for a capacitive sensor where the indication or metering means is outside the excitation circuit for the sensing capacitance.

It is a further specific object of this invention to provide high level demodulated output by means simple and small enough to be practically included together with the sensor so that a high level signal can be transmitted to the signal conditioning instrumentation, thus reducing environmentally induced error.

It is a further specific object of this invention to provide a means for producing such a high level signal in a way such that the signal can be transmitted to the signal conditioning electronics differentially, allowing the further advantages of standard differential input instrumentation to result in further improvement in accuracy and immunity to environmentally induced noise.

It is yet a further object of this invention to provide instrumentation for a capacitive sensor of sufficient output and sensitivity that in some applications the output of the measuring circuit can be coupled directly to an indicating meter without intermediate processing electronics of any kind, this despite the low capacitance values of the sensor and their consequent high impedance.

It is a further specific object of this invention to provide instrumentation which produces a bipolar, zero crossing, linear relationship between the difference of two sensor capacitances and the instrumentation output.

It is a further specific object of this invention to provide a demodulated output free from significant errors introduced by diode voltage drop or matching error.

It is a further specific object of this invention to provide the above advantages independent of size of demodulator filter capacitors and independent of the signal current drawn from the demodulator.

BRIEF SUMMARY OF THE INVENTION

An exemplary preferred embodiment of this invention discloses a circuit providing a signal representative of the difference between measuring and balancing impedances or capacitances in particular. Two mutually coupled circuit arms, normally inductors, are each fed the alternating electric excitation output of an oscillator or source in a way such that the excitation through a first arm produces in the second arm an effect opposite to that produced by said excitation in the first arm. The excitation through each arm or inductor is respectively fed to measuring and balancing capacitors and returned to the source via ground.

From the high side of the measuring and balancing capacitances opposite polarities of signals representing the response of these capacitances to the excitation are potentiometrically combined to give an output signal intermediate to the signals of opposite polarity. Alternatively, the signal may be connected differentially to the input of a differential instrumentation system to reduce error and noise further.

The operation of this exemplary preferred embodiment will be better understood by referring to a detailed description below in configuration with the figures of which:

FIG. 1 is a partial schematic and partial block diagram of an impedance measuring circuit according to a preferred embodiment of this invention; and, FIG. 2 shows a modified portion of the circuit of FIG. 1

DETAILED DESCRIPTION OF THE PREFERRED EMBODIMENT

Figure 1:
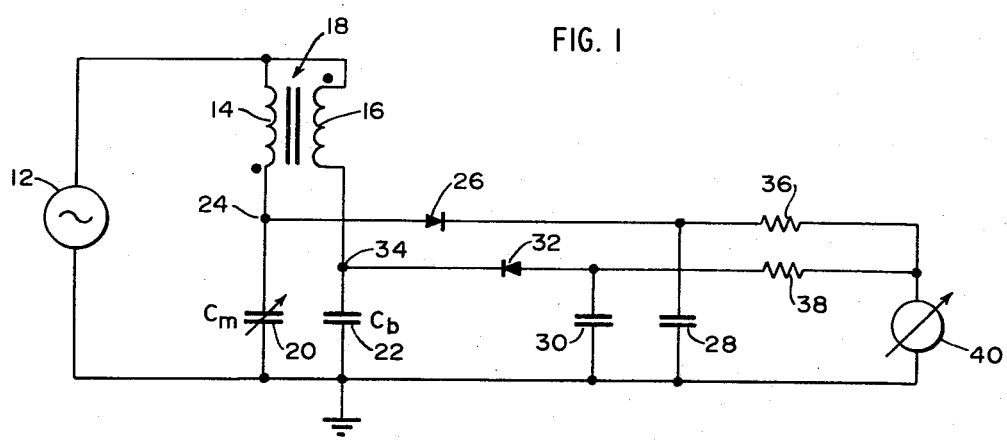

In FIG. 1 there is shown in partial block and partial schematic diagram from a preferred embodiment of this invention presented for purposes of illustration.

A sine-wave oscillator or source 12 supplies alternating electric excitation to the junction of two end terminals of separate windings 14 and 16 of a transformer 18. The opposite end terminals of the transformer windings 14 and 16 are electrically connected to one terminal of variable impedance 20 and impedance 22 respectively shown in FIG. 1 as capacitances $C_m$ and $C_b$. One or both of these capacitances may be variable. The other terminals of the capacitances 20 and 22 are connected together to a ground or common point for the source 12.

From a junction point 24 between winding 14 and impedance 20 rectifier 26 conducts toward one terminal of a capacitor 28. The other terminal of capacitor 28 is grounded. From one terminal of capacitor 30 a rectifier 32 conducts to a junction point 34 between the winding 16 and the impedance 22. The other terminal of the capacitor 30 is grounded.

From the ungrounded terminals of the capacitors 28 and 30 electric signals across the capacitors 28 and 30 are conducted through impedances 36 and 38 to one terminal of a D.C. meter or indicator 40. The other terminal of meter 40 is grounded. The impedances 36 and 38 may be resistances or low-pass filters such as inductances.

Figure 2:
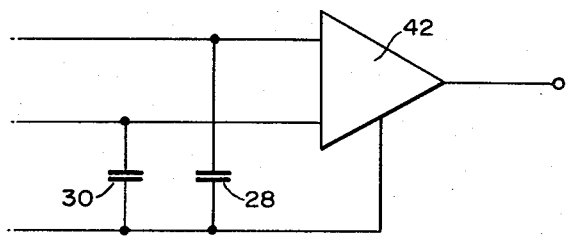

As shown in a partial schematic and block diagram, in FIG. 2 a two input summing amplifier 42 of other processing electronics may be substituted for meter 40 and impedances 36 and 38.

The two inputs of amplifier 42 are connected to the ungrounded terminals of the capacitors 28 and 30.

In operation, the features and advantages of this impedance measuring circuit can be understood only after its theory of operation is explained. Assuming that the windings 14 and 16 have a self-inductance L and that the coupling between them is 100 percent the mutual inductance is also L. The windings 14 and 16 are connected in FIG. 1 so that excitation through one winding induces a response in the other winding opposite to the response of that other winding to the excitation through it. The following transforms can be shown to apply:

$$V_1 = \frac{I}{j\omega C_m} \quad (1)$$

$$V_2 = \frac{I}{j\omega C_b} \quad (2)$$

Using $M = L$ in finding $I_1$ and $I_2$:

$$V_1 = V \left( \frac{1 + 2\omega^2 L C_b}{1 + \omega^2 L (C_b + C_m)} \right) \quad (3)$$

$$V_2 = V \left( \frac{1 + 2\omega^2 L C_m}{1 + \omega^2 L (C_b + C_m)} \right) \quad (4)$$

$$Vout = V_1 - V_2 = V \frac{2\omega^2 L (C_b - C_m)}{1 + \omega^2 L (C_b + C_m)} \quad (5)$$

at $$\omega^2 \gg \frac{1}{2LC_b}$$

$$Vout \simeq \frac{2V(C_b - C_m)}{C_b + C_m} \quad (6)$$

Here:
$V$ = output voltage of source 12
$V_1$ = voltage at terminal 24
$V_2$ = voltage at terminal 34
$L$ = self-inductance of and mutual inductance between the windings 14 and 16
$\omega$ = angular frequency of the source 12

Equation (6) indicates that by choosing "$\omega$" well above the frequency at which the windings 14 and 16 and the capacitors 20 and 22 resonate, the voltage between the terminals 24 and 34 is independent of frequency and very sensitive to variations in either $C_b$ or $C_m$. The sensitivity is approximately four times the sensitivity of an ordinary bridge.

It is particularly significant that, in addition to being more sensitive, the bridge output is here linearly related to the difference in capacitance. This remains true even for large $C_b - C_m$, provided that $C_b$ and $C_m$ remains constant, as is the case for an LVDC (linear variable differential capacitor), a typical sensor configuration for long range displacement measurement.

In a more general form taking $L_1$ = self-inductance of winding 14; $L_2$ = self-inductance of winding 16; and $M^2 = L_1 L_2$; then:

$$V_{out} \simeq \frac{V(M(C_b - C_m) + L_2 C_b - L_1 C_m)}{L_1 C_m + L_2 C_b + \frac{1}{\omega^2}} \quad (7)$$

where $$\omega^2 >> \frac{1}{L_1 C_m + L_2 C_b}$$

The circuit is frequency independent and also very sensitive.

To take advantage of the sensitivity opposite polarities from the terminals 24 and 34 are conducted through rectifiers 26 and 32 to the capacitors 28 and 30. These capacitors 28 and 30 consequently become oppositely charged to the peak positive and negative potential, i.e., potential excursions at the terminals 24 and 34.

If a large A.C. potential (say 100 $V_{p-p}$) is used for excitation, then the forward voltage drop of the diodes used is small compared to the excitation. In addition, due to the connection of the circuit, the effect of the voltage drops of the two diodes subtracts, so that only the mismatch in potential drop, and the change of this mismatch with temperature, appear as errors. This mismatch error change with temperature is typically less than $100 \mu V/°C$, or less than $1:10^6$ of the excitation voltage.

It is of particular significance that, due to the low impedance offered the measurement circuit by the transformer whose two sides are connected in an opposite sense, a demodulator can be used which draws peak currents orders of magnitude higher than the sensor current thus permitting large capacitors (on the order of 0.1$\mu$f) to be used for 30 and 28, and despite small sensor capacitances (for example 40 pf), even if large signal currents are drawn from the demodulator, resistors 36 or 38 may be made as low as the same order of magnitude as the reactive impedance of the sensor capacitances $C_m$ and $C_b$ without significantly affecting sensor accuracy or sensitivity. The high output thus produced permits greater overall accuracy of measurement to be achieved than had heretofore been practical.

A voltage intermediate to the voltage across each capacitor 28 and 30 is found at the junction of impedances 36 and 38. This intermediate voltage is an average if the impedances 36 and 38 are equal and it deviates from ground potential by an amount proportional to the difference between capacitors 20 and 22. This deviation is then indicated by the meter 40 or output signal of amplifier 42. Where impedances 36 and 38 are inductive, additional high frequency filtering occurs on the intermediate voltage.

Alternatively if the capacitors 28 and 30 are deleted, the intermediate voltage is intermediate to the average potential for opposite signal polarities of each capacitor 20 and 22. Because of this nulling feature there is no need for expensive reference potentials. The null condition for a generalized circuit according to equation (7) is:

$$\frac{C_b}{C_m} = \frac{L_1 + L_2 + L_1}{L_1 + L_2 + L_2} \quad (8)$$

allowing nulling for a normal condition of $C_b$ not equal to $C_m$.

The meter 40 or amplifier 42 also does not pass the full excitation of the circuit.

Having described an exemplary preferred embodiment other means for practicing this invention which within its spirit can be envisioned are intended to be covered hereby:

What is claimed is:

1. A measurement circuit for quantities related to a pair of like sign impedances comprising:

a source of excitation frequency;

a bridge circuit including said first pair of like sign impedances in adjacent arms of said bridge and a coupled pair like sign inductors in the other adjacent arms of said bridge, said two pairs being of opposite sign and resonant at a frequency below the frequency of said source;

means for exciting said bridge circuit from said source at the junctions of said like sign impedances; and a measurement circuit adapted to measure with respect to ground signals at each of the junctions between said pair of like sign impedances and said pair of coupled inductors;

said coupled inductors producing low source impedance for signal components at said junctions between said two pairs for current flow in said measurement circuit and due to bridge unbalance, said measurement circuit producing from said signal components additive ground referenced signals which are substantially independent of frequency at source frequencies above resonance for said bridge circuit.

2. The circuit of claim 1 in which said pair of like impedances related to said quantities are capacitive reactances.

3. The circuit of claim 2 further comprising:

an indicator;

means for applying a signal representing the excited response of one of said capacitive reactances to said indicator during one polarity of excitation to said measuring impedance; and means for applying a signal representative of the response of the other of said capacitive reactances to said indicator, during the opposite polarity of excitation to said balancing impedance.

4. The circuit of claim 3 further comprising:

means responsive to the peak magnitude of the responses of said capacitive reactances during the respective polarities of excitation producing the responses applied to said indicator; and means for applying to said indicator a signal intermediate to said peak magnitudes.

5. The circuit of claim 3 further comprising means responsive to the peak magnitude of the responses of said capacitive reactances during the respective polarities of excitation producing the responses applied to said indicator, wherein said excited responses and peak detected responses are of opposite polarity, and wherein said indicator comprises differential signal processing means responsive to the effective sum of said peak detected responses.

* * * * *